UNITED STATES PATENT OFFICE.

ANDREW THOMA, OF CAMBRIDGE, MASSACHUSETTS, ASSIGNOR TO NORTH AMERICAN CHEMICAL COMPANY, OF NEW YORK, N. Y., A CORPORATION OF MAINE.

SHOE-BOTTOM FILLER AND PROCESS OF MAKING THE SAME.

1,203,435.     Specification of Letters Patent.     Patented Oct. 31, 1916.

No Drawing. Original application filed May 11, 1908, Serial No. 432,083. Divided and this application filed March 26, 1912. Serial No. 687,292.

*To all whom it may concern:*

Be it known that I, ANDREW THOMA, a citizen of the United States, and resident of Cambridge, in the county of Middlesex and State of Massachusetts, have invented an Improvement in Shoe-Bottom Fillers and Processes of Making the Same, of which the following description is a specification.

My present invention relates to a shoe-bottom filler, being a division of the parent application Serial No. 432,083, filed May 11, 1908, now Patent No. 1,032,312, dated July 9, 1912, which is in part, a derivative from my Patent No. 832,002, Sept. 25, 1906, (as is clear from the references to the latter found at page 1, lines 14–32, 50–53, 55–57, 67, page 2, lines 30–40, 56, 63–71, and elsewhere, as page 5 beginning at line 27, in No. 1,032,312, which set forth the connection of the later patent with its predecessor No. 832,002). The broad or generic invention of my said application, consists of a shoe-bottom filler having a waxy, gummy or pitchy base combined with a restraining agent of a pasty nature, mixed with the required amount of comminuted body filler material, the proportions being such that the compound is firm under practicable conditions of temperature in use, elastic, and sleek under a smoothing iron or daubing tool when applied to the shoe or leather. The said base, it is stated, may comprise a wide range of ingredients, as more particularly enumerated in certain of my patents there mentioned, while the restraining agents may comprise pastes of vegetable origin, such as ordinary starch, dextrin, gluten or gum arabic, or of animal origin such as glue, casein, albumen, or of mineral origin such as the soluble silicates or silicic acid. My parent application (now Patent No. 1,032,312 above) explains both the theory and practice of the invention in its broader aspects, in connection with a wide variety of species and processes, and contains the broad or generic claims to cover all these species and processes, and the specific claims of that species which employs starch paste and wax-tailings.

The present divisional application relates primarily to the combination of such restraining agents, and more particularly those of vegetable origin, such as dextrin, for example, with the rosins and resinous gums (and ground cork or the like) as enumerated in my foundation Patent No. 832,002 of September 25, 1906, such as gutta percha or other vegetable gums, including balata, Pontianak, almadeina, chicle, tuna.

In the present application, particular prominence is given to Pontianak and to resin derived from said Pontianak and to a direct boiling process by which the gum is disintegrated or decomposed so as to produce or derive said resin, and all these features are specifically claimed, but the specification is written primarily from the standpoint of its broadest claim, claim 1, which is not limited in these specific respects. In order to define the position of this application with relation to the parent case and the various other divisional cases and to make clear the scope of this case, I point out that this broadest claim (from which standpoint the specification is primarily written) includes the paste-making ingredient as its principal or specific limitation, combined with, broadly, any kind of a resinous gum and any kind of a softening oil, and hence includes gutta percha, for instance, hether of a high grade or of a low grade, and no matter how treated. On the other hand, the remaining claims contain as their principal or specific limitations, the resin derived from a gum, and certain of them refer to a specific gum. Certain of said claims also contain the additional specific limitation of dextrin. While, therefore, the application is properly written from the standpoint of said broad claim 1, so as to include the broad formula of gutta percha considered as a type, and whether treated one way or another, and whether the formula is subject or not to the other specific limitations, it includes the narrow and more specific formula of a resin derivative from Pontianak gum and dextrin, and the specific processes. Claim 2 stands herein as the result of an interference with the patent of James P. Keener No. 1,019,964 of March 12, 1912.

Preferably I first refer to the leading formula or disclosure of ingredients first mentioned in the Patent, No. 832,002 above, in which the filler binder or compound consists of a mixture of five parts of gutta percha to three parts of rosin and two parts of a solvent or softening oil like paraffin-oil; and in which it is stated that instead of the gutta percha I may use other vegetable gums, such as balata, Pontianak, and the others above mentioned, or low-grade rubbers may also be mixed in to some extent. I use the word "rosin" as synonomous with "resin" in the formula of my patent just mentioned, to designate the specific article known also as colophony and which is frequently designated as "resin" and more properly as "rosin." As the quality of vegetable gums is often unstable, the amount of oil is varied so as to give satisfactory results, and this softening oil may be of mineral or vegetable origin and thick or thin, the quantity used depending upon its body or quality. The mass or at least the gum, Pontianak being herein given preference is then subjected to a melting heat until the vegetable gum, Pontianak for example, is disintegrated, which converts it into a resin derivative, so that it becomes, for the purposes of the binder, a resin, and in proper condition to unite with the other resinous part, the oil helping assimilate the two and giving a temper or smoothness and pliability to the compound, which is fluid while hot. The paste or paste-making ingredients, of starch or dextrin, for example, as already enumerated dextrin being herein given preference, may be mixed into the filler as a powder, solution, or in the form of ordinary wet paste, and may be introduced before the cork and binder are mixed or as they are being mixed or afterward, all as explained in my parent application and which need not therefore be here repeated in detail. The proportionate amount of the paste-forming material used varies according to the nature of the rest of the compound and of the granulated body-material. The following formulæ are given as practical and illustrative: granulated cork 6 parts by weight, coarse flour 4 parts by weight, and the gummy binding material 11 parts by weight; or, granulated cork 8 parts by weight, dextrin 4 parts by weight, and the gummy binding material 14 parts by weight.

The filler may be used hot or cold, and if hot will not cling to the spatula or dauber in being applied to the shoe-bottom. I have purposely omitted from this specification, in order to avoid making it prolix, most of the explanation of the use and advantages of my invention, as it is fully elaborated in the parent case of which this is a division, this division being restricted in its description and claims to one of the branches or species of the invention which, although included in the broad, generic claims of said parent case, could not be therein claimed specifically because an alternative species is therein claimed.

My principal object is to make a filler which combines the hardening and toughening principle with the waxy or gummy, sticky, heat-sensitive character of my previous fillers, so that the resultant product is permanently pliable and tough but not liable to soften under the moderate heat to which it is subject in use, when once heated, installed, and set. When installed in a shoe, it sets at once so that the shoe can pass on almost immediately to the next step in its manufacture and yet it still retains and maintains the permanent pliability, elasticity, etc., substantially permanent and unchanged for an indefinite period extending beyond the natural life of the shoe.

Besides my principal object, as above stated, my invention includes subordinate or less prominent features, as more definitely pointed out in certain of the subordinate claims.

I do not restrict my invention to requiring the filler to be applied hot, as the same ingredients as above set forth, may be used cold.

My co-pending application, Serial No. 707,017, filed July 1, 1912, and now Patent No. 1,115,988, dated Nov. 3, 1914, (which is also a divisional case of the same parent application as the present) contains broad claims which are generic to both the dextrin species of that application and of this application, and hence the claims herein contained are otherwise limited.

I am led to prefer Pontianak, or gutta Jelutong, dead Borneo, or besk, (which resembles a low grade gutta percha and is sometimes so called), first, because, of its abundance and cheapness, and, second, because of its extreme stickiness (when treated as above set forth), and special adaptability to the peculiar requirements of shoe-bottom filler. Ordinary commercial Pontianak consists essentially of resins, containing a small percentage of a rubber hydro-carbon and from 75% to 90% resins. I prefer to derive the resin by the boiling process above instead of employing the residual Pontianak resin of commerce, because by my process the product seems to have a better consistency and more toughness adaptable to shoe fillers. This product of the boiling process is soluble in acetone, and, therefore, viewed from the standpoint of rubber technology, is a resin and no longer a gum, the word resin being understood to cover bodies soluble in acetone (whether saponifiable or not), and to cover also bodies feebly soluble in acetone but soluble in dichlorhydrin, a certain amount of depolymerized rubber sometimes occurring in actual practice in the acetone extract. In the original gum or Pontianak, the high percentage of resinous matter is merely held present as a part of the gum by an exceedingly small percentage of softening properties or gummy properties in a fibrous cell structure, which is broken down and destroyed by the disintegrating heat or decomposition, which drives off the volatile constituents and leaves the resin. The amount and duration of heat required are simply enough completely to disintegrate the gum, or decompose it to the extent of destroying or breaking down said cell structure or fiber, which becomes modified or absorbed or lost altogether, according to the particular grade of the gum, i. e., according to the proportion of resin contained in its composition, but not to the extent of decomposing the gum into its ultimate gaseous and coke parts, which, of course, would not be sticky and would not serve my purpose. It is not practicable to state any fixed temperature or length of time, because this gum, and in fact all the vegetable gums mentioned, including the usual low grades of gutta percha, vary in quality on the market, and some of them, particularly Pontianak, rapidly oxidize and deteriorate, but one skilled in the art will have no difficulty in determining the amount and duration of heat necessary, according to the special condition of the gum at any given time. The seething or boiling point is readily determined by observing the tendency toward ebulition, and the described point of disintegration or decomposition is reached when all stringiness and tendency to stringiness have disappeared and the liquid has become thin and smooth like water, so that there can be no return to the gummy state or form upon cooling.

Having described my invention, what I claim as new and desire to secure by Letters Patent is:

1. A shoe-bottom filler, comprising a base of comminuted body material, and a binder comprising a resinous gum, a softening oil, and a paste-making ingredient.

2. A composition for filling shoes comprising a base of comminuted material and a binder comprising rosin, resin derived from a gum, oil and dextrin.

3. The herein described process, consisting of applying a melting heat to rosin, a resinous vegetable gum, and an oil solvent until said gum is disintegrated into a resin derivative, and thoroughly mixing with said solution a paste-making ingredient which, when the compound is cold, will maintain the same stiff for a shoe-bottom filler and permanently pliable but non heat-influenced under ordinary temperature conditions of use.

4. The herein described process, consisting of applying a melting heat to rosin, Pontianak, and an oil solvent until said Pontianak is disintegrated into a resin derivative, and thoroughly mixing dextrin therewith to a consistency maintaining the compound, when cold, stiff for a shoe-bottom filler and permanently pliable but non heat-influenced under ordinary temperature conditions of use.

In testimony whereof, I have signed my name to this specification, in the presence of two subscribing witnesses.

ANDREW THOMA

Witnesses:
GEO. H. MAXWELL,
JAMES R. HODDER.